(12) United States Patent
Lee

(10) Patent No.: US 10,866,352 B1
(45) Date of Patent: Dec. 15, 2020

(54) LIGHT EMITTING DEVICE

(71) Applicant: CHICONY POWER TECHNOLOGY CO., LTD., New Taipei (TW)

(72) Inventor: Yueh-Heng Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/661,423

(22) Filed: Oct. 23, 2019

(30) Foreign Application Priority Data

Jul. 10, 2019 (TW) .............................. 108124346 A

(51) Int. Cl.
*F21V 8/00* (2006.01)

(52) U.S. Cl.
CPC ......... *G02B 6/0043* (2013.01); *G02B 6/0051* (2013.01); *G02B 6/0055* (2013.01); *G02B 6/0088* (2013.01); *G02B 6/0091* (2013.01)

(58) Field of Classification Search
CPC .. G02B 6/0043; G02B 6/0051; G02B 6/0055; G02B 6/0088; G02B 6/0091
See application file for complete search history.

(56) References Cited

U.S. PATENT DOCUMENTS

| 8,322,874 B2 * | 12/2012 | Ender | G02B 6/0065 362/97.1 |
| 8,928,106 B2 * | 1/2015 | Kajiya | G02F 1/1676 257/459 |
| 9,329,329 B2 * | 5/2016 | Ide | G06T 11/00 |
| 9,442,240 B2 * | 9/2016 | Chang | G02B 6/0016 |
| 10,101,521 B1 * | 10/2018 | Burgio, Jr. | G02B 6/0061 |
| 10,371,884 B2 * | 8/2019 | Ninan | G02B 6/0068 |
| 2003/0117790 A1 * | 6/2003 | Lee | G02B 6/0043 362/617 |

(Continued)

FOREIGN PATENT DOCUMENTS

| CN | 201041608 Y | 3/2008 |
| CN | 104459843 B | 11/2016 |

(Continued)

OTHER PUBLICATIONS

Dot-pattern design of a light guide in an edge-lit backlight j using a regional partition approach. (Published Apr. 2007). entire document. http://www.breault.com/sites/default/files/knowledge_base/wp_spie_037_edge_backlight.pdf.*

*Primary Examiner* — Anabel Ton
(74) *Attorney, Agent, or Firm* — Muncy, Geissler, Olds & Lowe, P.C.

(57) ABSTRACT

The present disclosure discloses a light emitting device. A plurality of luminous dots disposed on a light guiding plate is distributed on a first area and a second area of the light guiding plate by a first density and a second density, respectively. A plurality of diffusion dots disposed on a diffusion film is distributed on a third area and a fourth area of the diffusion film by a third density and a fourth density, respectively. The first area of the light guiding plate is projected to the third area of the diffusion film, and the second area of the light guiding plate is projected to the fourth area of the diffusion film. A sum of the first density and the third density after an approximation and a sum of the second density and the fourth density after the approximation are both equal to a predetermined value.

7 Claims, 10 Drawing Sheets

(56) References Cited

U.S. PATENT DOCUMENTS

| | | | |
|---|---|---|---|
| 2004/0095744 A1* | 5/2004 | Yu ........................ | G02B 6/0036 |
| | | | 362/620 |
| 2007/0147088 A1* | 6/2007 | Chien .................. | G02B 6/0061 |
| | | | 362/616 |
| 2016/0131820 A1* | 5/2016 | Lin ...................... | G02B 6/0041 |
| | | | 362/607 |

FOREIGN PATENT DOCUMENTS

| | | |
|---|---|---|
| CN | 104791665 B | 5/2017 |
| JP | 2000-024334 A | 1/2000 |
| JP | 2013-225439 A | 10/2013 |
| TW | 201027192 A | 7/2010 |
| TW | M395837 U | 1/2011 |
| TW | I467283 B | 1/2015 |
| TW | I536047 B | 6/2016 |

* cited by examiner

LIGHT EMITTING DEVICE

BACKGROUND OF THE DISCLOSURE

1. Field of the Disclosure

The present disclosure relates to a light emitting device, particularly to a light emitting device providing surface source of light.

2. Description of the Related Art

In general, a light emitting device applied to an electronic device (e.g., a display screen, a computer, a notebook computer, a tablet computer, or a smartphone) or a light emitting device for presenting a pattern mainly includes a light source module and a light guiding plate. The light guiding plate receives the light emitted from the light source module and produces a uniform surface source of light.

Specifically, one of the surfaces of the light guiding plate usually has a plurality of microstructures or dots for canceling the total internal reflection of light at some places in the light guiding plate to direct the light toward a predetermined light emergence surface. Because the light energy near the light entry side of the light guiding plate is higher, the fewer microstructures (or dots) are needed around the light entry side of the light guiding plate. Conversely, because the light energy far from the light entry side (for clarity, hereinafter referred to as the counter light entry side) is lower, the more microstructures (or dots) are needed around the counter light entry side of the light guiding plate. Therefore, through the configuration that the microstructures are gradually denser from the light entry side to the counter light entry side, a surface source of light can be produced with uniform luminance.

When the optical path (i.e., the distance from the light entry side to the counter light entry side) becomes much longer, the trend that the microstructures are gradually denser from the light entry side to the counter light entry side becomes more obvious. In other words, when the optical path is much longer, the density of the microstructures near the light entry side of the light guiding plate is needed to be much lower to maintain uniform luminance. However, if the density of the microstructures becomes too low, a visually-apparent graininess will show up resulting in numerous particle-like light spots when users look down at the surface source of light. As regards the problem, a diffusion film is generally used to provide hazing (or concealing) effects. However, a conventional diffusion film is only capable of uniform haze. For the conventional diffusion film, the higher haze, the better hazing (or concealing) capability, but it also causes an overall decreased luminance of a light emitting device which adopts the conventional diffusion film.

Since the conventional diffusion film has a uniform haze, a developer can only make a trade-off between "considering the graininess of the light entry side" and "considering the luminance of the counter light entry side." For example, if the developer chooses to consider the graininess of the light entry side (i.e., to overcome the light-spot problem of the light entry side), he or she must select a diffusion film with much higher haze, which will cause a significantly-decreased luminance of the counter light entry side, then resulting in an overall decreased luminance. On the other hand, if the developer chooses to consider the luminance of the counter light entry side (i.e., to prevent the low-luminance problem of the counter light entry side) and selects a diffusion film with much lower haze, which will ensure that the luminance of the counter light entry side is not affected and maintain the overall higher luminance, yet the graininess around the light entry side will become visually apparent, resulting in a sense of defectiveness. Another straightforward solution is to place diffusion films only on those areas with the above-mentioned grainy-light-spot problems, but this solution will produce some visually-noticeable differences at the border between the area with the diffusion film and the rest of the area without the diffusion film, resulting in more serious problem in defectiveness. In sum, the shortcomings of the prior art are stated as follows: (1) visually-apparent graininess around the light entry side (if a diffusion film with relatively-low haze is used); (2) decreased luminance far from the light entry side (if a diffusion film with relatively-high haze is used); and (3) visually-noticeable difference (if one or more diffusion films are only placed on one or several specific areas to solve the grainy-light-spot problems).

Additionally, refer to FIG. 1A, which is a schematic top view of a conventional light guiding plate 91 and a conventional diffusion film 92. In practice, the microstructure of the light guiding plate 91 has a limitation from a minimum density of the microstructure (e.g., 10%). When the density of the microstructure is less than the minimum density, even disposing the diffusion film 92, a visually-apparent graininess will still appear, as shown around the bottom area in FIG. 1A. It should be noted that, in order to clearly mark the light guiding plate 91 and the diffusion film 92, the light guiding plate 91 in FIG. 1A is slightly larger in size than the diffusion film 92. In practice, the light guiding plate 91 and the diffusion film 92 can have the same size as each other.

Additionally, as shown in FIG. 1B, which is a cross-sectional schematic drawing of a conventional light guiding plate 91 and a conventional diffusion film 92. Conventionally, the diffusion film 92 is accomplished by adding numerous diffusion particles 921 into a transparent film and is disposed above the light guiding plate 91. The diffusion particles 921 easily peel off and drop onto the light guiding plate 91, then scratch the surfaces of the light guiding plate 91. On the other hand, conventionally, to further increase the haze (or the concealing capability) of the diffusion film 92, the thickness of the diffusion film 92 must be correspondingly increased.

SUMMARY OF THE DISCLOSURE

In view of the above issue, it is a primary objective of the present disclosure to provide a light emitting device. By the density of the diffusion dots distributed on the diffusion film being matched with the density of the luminous dots distributed on the light guiding plate, the problem of the conventional diffusion film, which is not adjusted to the different distances from the light source and not correspondingly provided with different hazes then causing the sense of defectiveness or the decreased luminance, thus can be solved.

To achieve the above objective, the present disclosure provides a light emitting device, which includes a light source module, a light guiding plate, a luminous dot unit, a diffusion film and a diffusion unit. The light guiding plate is disposed adjacent to the light source module. The luminous dot unit is disposed on the light guiding plate. The luminous dot unit includes a plurality of luminous dots distributed on a surface of the light guiding plate. The luminous dots are distributed on a first area of the light guiding plate by a first density, and the luminous dots are distributed on a second area of the light guiding plate by a second density. The second density is different from the first density. The diffusion film is disposed above the light guiding plate. The diffusion unit is disposed on the diffusion film. The diffusion unit includes a plurality of diffusion dots distributed on a surface of the diffusion film. The first area of the light guiding plate is correspondingly projected to a third area of the diffusion film, and the second area of the light guiding plate is correspondingly projected to a fourth area of the diffusion film. The diffusion dots are distributed on the third area by a third density, and the diffusion dots are distributed on the fourth area by a fourth density. The fourth density is different from the third density. The sum of the first density and the third density after an approximation is equal to a predetermined value. The sum of the second density and the fourth density after the approximation is equal to the predetermined value.

According to an embodiment of the disclosure, the shortest distance from the first area to the light source module is less than the shortest distance from the second area to the light source module. The first density is less than the second density.

According to an embodiment of the disclosure, the light emitting device further includes a transmissive and reflective layer disposed above the light guiding plate.

According to an embodiment of the disclosure, the transmissive and reflective layer has a reflectivity which is more than 5% and less than 95%.

According to an embodiment of the disclosure, the reflectivity of the transmissive and reflective layer decreases as a thickness of the light guiding plate increases.

According to an embodiment of the disclosure, the light guiding plate includes a first bottom surface, a first top surface on the opposite side of the first bottom surface, and a side connecting the first bottom surface and the first top surface. The diffusion film includes a second bottom surface facing the first top surface and a second top surface on the opposite side of the second bottom surface. The luminous dot unit is disposed on the first bottom surface, the diffusion unit is disposed on the second bottom surface, and the transmissive and reflective layer is disposed on the second top surface. The light source module emits light towards the side.

According to an embodiment of the disclosure, the light guiding plate includes a first bottom surface, a first top surface on the opposite side of the first bottom surface, and a side connecting the first bottom surface and the first top surface. The diffusion film includes a second bottom surface facing the first top surface and a second top surface on the opposite side of the second bottom surface. The luminous dot unit is disposed on the first bottom surface, the diffusion unit is disposed on the second top surface, and the transmissive and reflective layer is disposed between the first top surface and the second bottom surface. The light source module emits light towards the side.

According to an embodiment of the disclosure, the light guiding plate includes a first bottom surface, a first top surface on the opposite side of the first bottom surface, and a side connecting the first bottom surface and the first top surface. The diffusion film includes a second bottom surface facing the first top surface and a second top surface on the opposite side of the second bottom surface. The luminous dot unit is disposed on the first bottom surface, the diffusion unit is disposed on the second bottom surface and the second top surface, and the transmissive and reflective layer is disposed on the first top surface. The light source module emits light towards the side.

According to an embodiment of the disclosure, the light emitting device further includes a reflection plate disposed below the light guiding plate.

According to an embodiment of the disclosure, when the diffusion film and the diffusion unit is formed by a first template, each of the diffusion dots is an outwardly protruding microstructure; when the diffusion film and the diffusion unit is formed by a second template which is cast from the first template, each of the diffusion dots is an inwardly concaving microstructure.

As described above, according to the light emitting device in the present disclosure, the light guiding plate has the first area and the second area, correspondingly projected to the third area and the fourth area of the diffusion film, respectively. Also, the luminous dots are distributed on the first area and the second area of the light guiding plate by the first density and the second density, respectively. The diffusion dots are distributed on the third area and the fourth area of the diffusion film by the third density and the fourth density, respectively. The third density is different from the fourth density to form the diffusion film having different hazes in different areas. Further, by the sum of the first density and the third density after the approximation and the sum of the second density and the fourth density after the approximation both being equal to the predetermined value, the uniform illumination and the maintained luminance of the light emitting device can be achieved at the same time.

DETAILED DESCRIPTION OF THE PREFERRED EMBODIMENT

Hereafter, the technical content of the present disclosure will be better understood with reference to preferred embodiments.

Figure 1A:
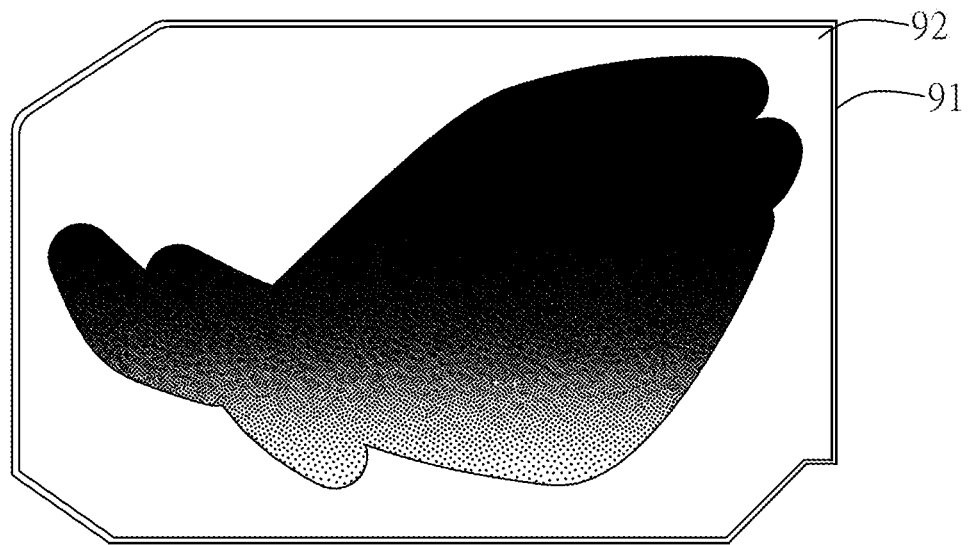
FIG. 1A is a schematic top view of a conventional light guiding plate and a conventional diffusion film.
Figure 1B:
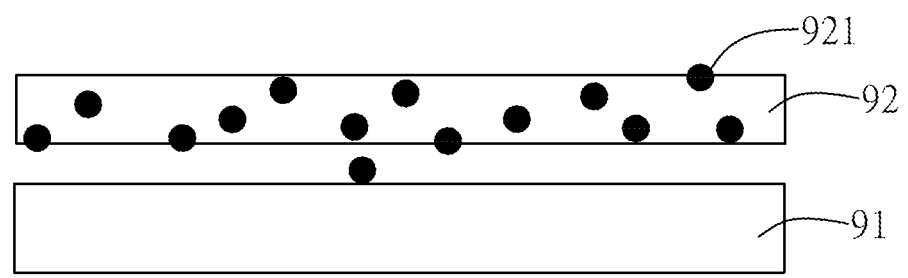
FIG. 1B is a cross-sectional schematic drawing of a conventional light guiding plate and a conventional diffusion film.
Figure 2:
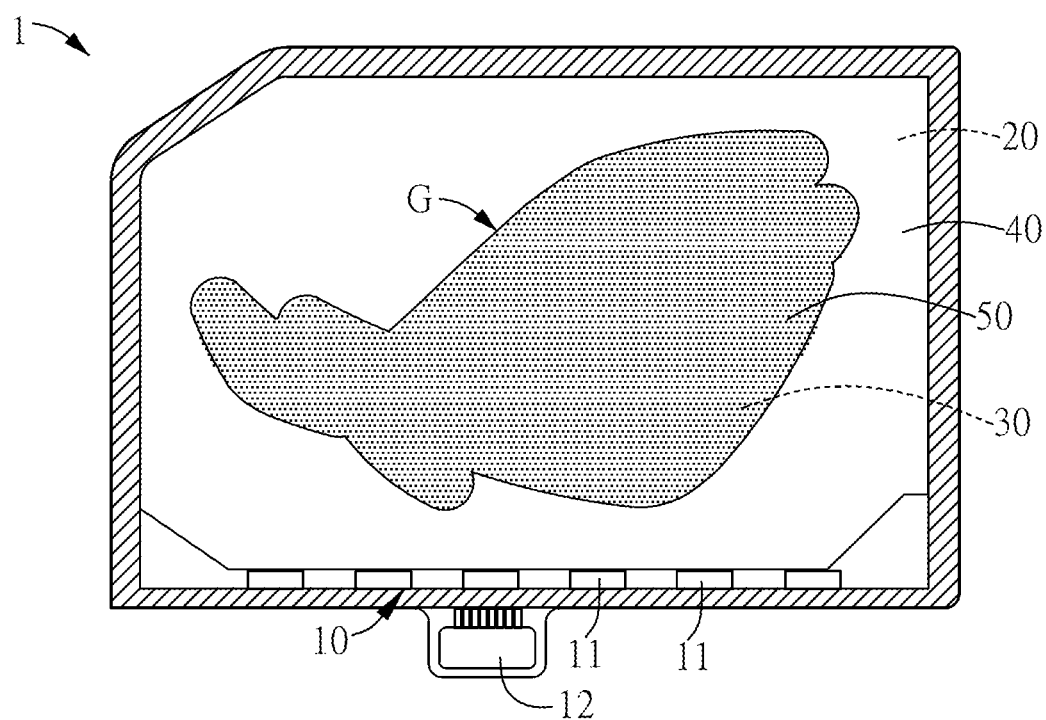
FIG. 2 is a schematic top view showing a light emitting device in a first embodiment of the present disclosure.
Figure 3:
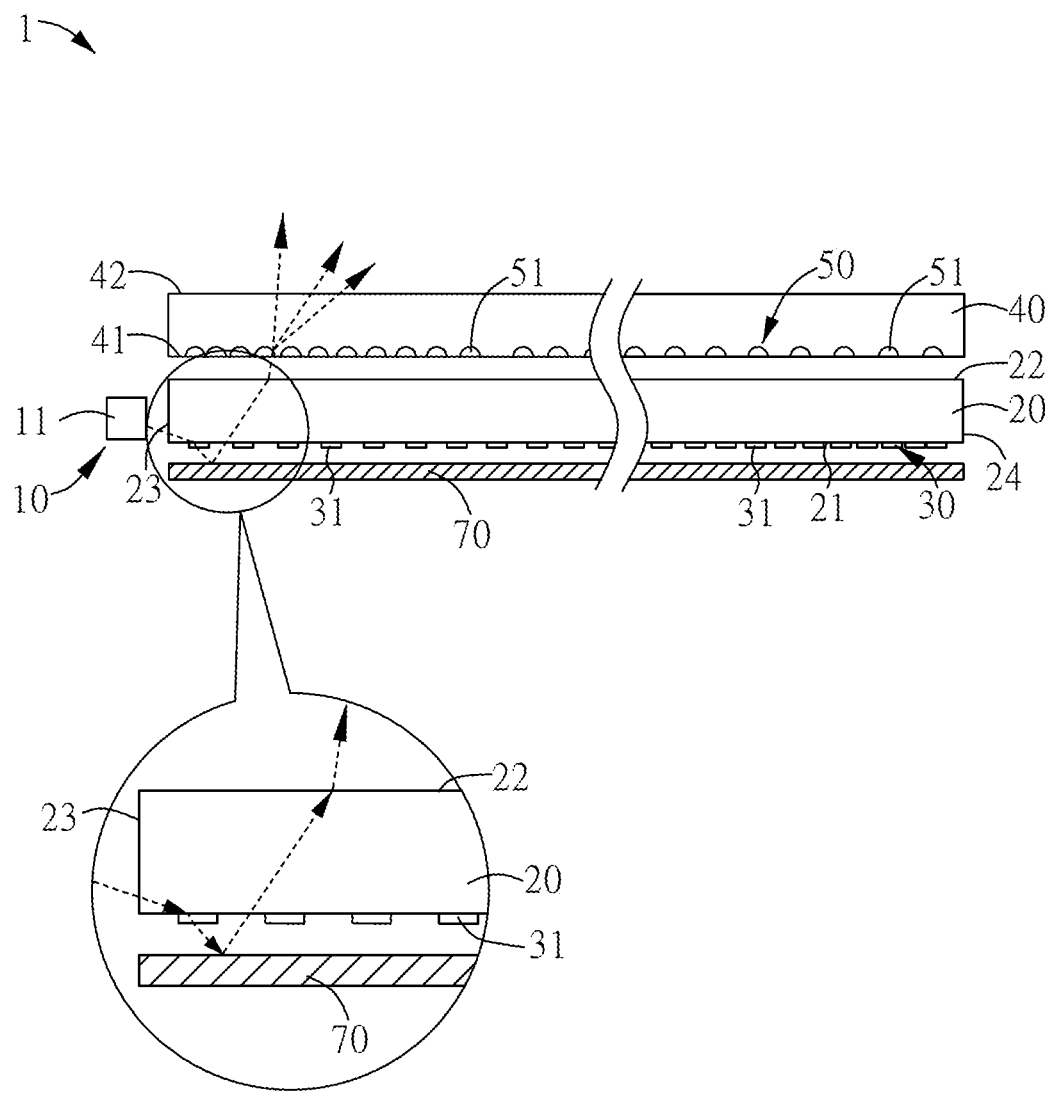
FIG. 3 is a cross-sectional schematic drawing of the light emitting device shown in FIG. 2.

FIG. 2 is a schematic top view showing a light emitting device 1 in a first embodiment of the present disclosure. FIG. 3 is a cross-sectional schematic drawing of the light emitting device 1 shown in FIG. 2. Referring to both FIG. 2 and FIG. 3, in the first embodiment, the light emitting device 1 includes a light source module 10, a light guiding plate 20, a luminous dot unit 30, a diffusion film 40, a diffusion unit 50 and a reflection plate 70. The light source module 10 includes a plurality of light emitting units 11 and a circuit board 12. The light emitting units 11 are coupled to the circuit board 12. The light emitting units 11 is laterally spaced in the horizontal direction, as shown in FIG. 2.

As shown in FIG. 2 and FIG. 3, the light guiding plate 20 is disposed adjacent to the light source module 10. Preferably, one side of the light guiding plate 20 is closely adjacent to the light emitting units 11. In the first embodiment, the light guiding plate 20 includes a first bottom surface 21, a first top surface 22 on the opposite side of the first bottom surface 21, and a plurality of sides connecting the first bottom surface 21 and the first top surface 22. The light source module 10 emits light toward one of the sides. The side of the light guiding plate 20, which is closely adjacent to the light emitting unit 11, is referred to as a light entry side 23, and the opposite side of the light entry side 23 is referred to as a counter light entry side 24. The light guiding plate 20 is configured to receive the light emitted by the light emitting units 11 of the light source module 10. The light enters the inside of the light guiding plate 20 from the light entry side 23.

As shown in FIG. 3, the luminous dot unit 30 is disposed on the light guiding plate 20. In more detail, the luminous dot unit 30 is used to cancel the total internal reflection of light at some specific locations inside the light guiding plate 20, and can guides the light to a light emergence surface, such as the upper surface of the light guiding plate 20, herein referred to as the first top surface 22. Specifically, the luminous dot unit 30 includes a plurality of luminous dots 31 distributed on a surface of the light guiding plate 20. In the first embodiment, the luminous dots 31 are disposed on the lower surface of the light guiding plate 20, herein referred to as the first bottom surface 21. The luminous dots 31 can be implemented by printed ink dots or rugged microstructures (see FIG. 12), for example, numerous outwardly protruding or inwardly concaving microstructures for canceling the total internal reflection of light. In the first embodiment, the luminous dots 31 are exemplified by printed ink dots, as shown in FIG. 3. Through printing ink having a different refractive index from the light guiding plate 20, different propagating directions of light are generated when the light hits the luminous dots 31 (e.g., heading-up and heading-down), and some of the light is guided to the first top surface 22 because they are reflected by the reflection plate 70. Further, the preferred luminous dot unit 30 of the first embodiment may form a specific pattern G (see FIG. 4). That is, the distribution of the luminous dots 31 may be presented as the specific pattern G. The specific pattern G can be a pattern which is well-recognized by users.

The reflection plate 70 is disposed below the light guiding plate 20 for reflecting the light emitted out from the first bottom surface 21. The reflection plate 70 reflects the light back to the light guiding plate 20, by which part of the light will perform the total internal reflection once again and other part of it will be redirected toward the first top surface 22 (i.e., the light emergence surface). The reflection plate 70 can be implemented by a white reflective sheet (a film with printed white ink), a silver reflective sheet (a film with printed silver paint) or a multilayer film, but the present disclosure is not limited thereto. In other exemplifications, the reflection plate 70 is also applied to the following second, third, fourth, fifth, and sixth embodiments. That is, the reflection plate 70 is also disposed below the light guiding plate 20 of the light emitting device 1a, 1b, 1c, 1d, 1e (see FIG. 8, 10, 11, 12, and 13A).

Figure 4:
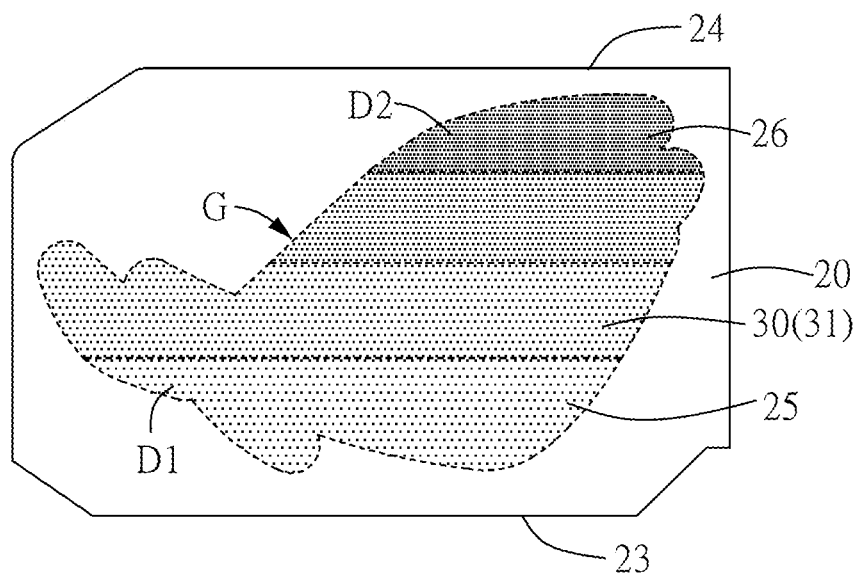
FIG. 4 is a schematic top view of a light guiding plate and a luminous dot unit of the light emitting device shown in FIG. 2.

FIG. 4 is a schematic top view of the light guiding plate 20 and the luminous dot unit 30 of the light emitting device 1 shown in FIG. 2. In the first embodiment, the light guiding plate 20 can be separated into a plurality of areas according to the difference of the area density (number per unit area) of the luminous dots 31, for example, four areas separated by three broken lines, as shown in FIG. 4. Specifically, due to the higher light-energy intensity near the light entry side 23, a smaller number of luminous dots 31 are provided around the light entry side 23. That is, the distribution of the luminous dots 31 near the light entry side 23 has a lower area density. Conversely, since the light-energy intensity near the counter light entry side 24 is lowered due to the consumption, a greater number of luminous dots 31 are provided around the counter light entry side 24. That is, the distribution of the luminous dots 31 near the counter light entry side 24 has a higher area density. As shown in FIG. 4, the distribution of the luminous dots 31 is configured gradually denser from the light entry side 23 to the counter light entry side 24, which is the aforementioned configuration that the microstructures are gradually denser from the light entry side to the counter light entry side.

FIG. 2 and FIG. 4 illustrate the technical features of the first embodiment. For clarity, two areas among the four areas in FIG. 4 are taken as an example, which are the two areas closest to the light entry side 23 and the counter light entry side 24, hereafter referred to as a first area 25 and a second area 26, respectively. In other words, the shortest distance from the first area 25 to the light source module 10 is less than the shortest distance from the second area 26 to the light source module 10. Moreover, the luminous dots 31 are distributed on the first area 25 of the light guiding plate 20 by a first density D1, and the luminous dots 31 are distributed on the second area 26 of the light guiding plate 20 by a second density D2, wherein the second density D2 is different from the first density D1. In the first embodiment, since the first area 25 is much closer to the light entry side 23 than the second area 26, the first density D1 is smaller than the second density D2, as shown in FIG. 4.

In general, the luminous dots 31 can be considered being uniformly distributed within one area (uniform area density in one specific area). Specifically, in this exemplification, the first density D1 is the ratio of the total occupied area of the luminous dots 31 within the first area 25 to the area of the first area 25 (i.e., the number of the luminous dots 31 within the first area 25×the area of single luminous dot 31/the area of the first area 25×100%), and the second density D2 is the ratio of the total occupied area of the luminous dots 31 within the second area 26 to the area of the second area 26 (i.e., the number of the luminous dots 31 within the second area 26×the area of single luminous dot 31/the area of the second area 26×100%). When designing the distribution of the luminous dots 31 during the development of the light emitting device 1, the luminous-dot densities (e.g., the first density D1 and the second density D2) of the respective areas (e.g., the first area 25 and the second area 26) can be determined according to the distance between one of the respective areas and the light emitting units 11.

Figure 5:
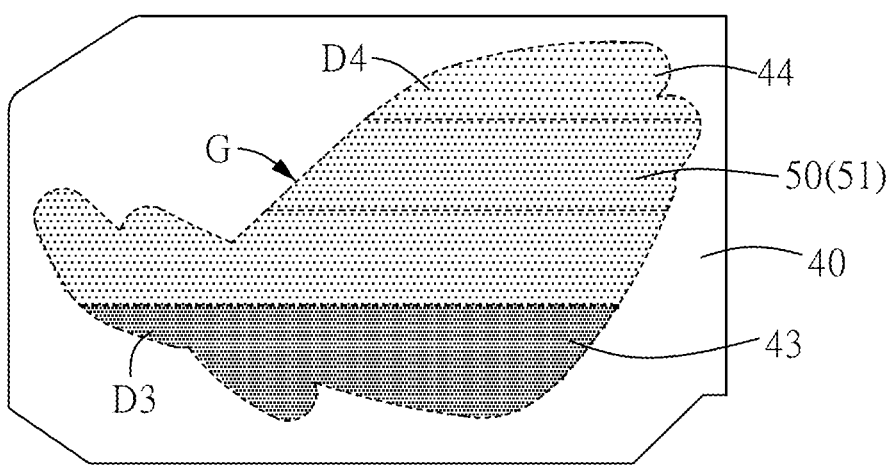
FIG. 5 is a schematic top view of a diffusion film and a diffusion unit of the light emitting device shown in FIG. 2.

As shown in FIG. 3, the diffusion film 40 is disposed above the light guiding plate 20. The diffusion film 40 of the first embodiment is adjacent to the first top surface 22 (i.e., the light emergence surface) of the light guiding plate 20 to receive the light from the light guiding plate 20. The diffusion film 40 includes a second bottom surface 41 facing the first top surface 22 and a second top surface 42 disposed on the opposite side of the second bottom surface 41. FIG. 5 is a schematic top view of the diffusion film 40 and the diffusion unit 50 of the light emitting device 1 shown in FIG. 2. Referring to FIG. 3 and FIG. 5, the diffusion unit 50 is disposed on the diffusion film 40 for changing the direction of the propagation of the light. The diffusion unit 50 includes a plurality of diffusion dots 51 distributed on the surface of the diffusion film 40. In this embodiment, the diffusion unit 50 is disposed on the lower surface of the diffusion film 40, herein referred to as the second bottom surface 41. In other embodiments, the diffusion unit 50 may also be disposed on the upper surface of the diffusion film 40, herein referred to herein as the second top surface 42. The diffusion dots 51 may be numerous outwardly protruding (see the diffusion dot 51e of FIG. 13A) or inwardly concaving (as seen in this embodiment) microstructures to change the directions of which the light travels. In the first embodiment, the diffusion dots 51 take the inwardly concaving microstructures as example. As indicated by the arrow symbols in FIG. 3, the light emitted from the light source module 10 enters the light guiding plate 20 via the light entry side 23, reaches the luminous dots 31, and is refracted by the luminous dots 31 and reflected by the reflection plate 70, then directed to the diffusion film 40. When the light reaches the diffusion dots 51 and is refracted by one of them, its propagating direction is changed, and thus the light can be emergent from the diffusion film 40 at a larger angle of emergence to achieve an overall effect of haze.

Additionally, in the first embodiment, although the diffusion dots 51 are disposed on the second bottom surface 41 of the diffusion film 40, the diffusion dots 51 are numerous inwardly concaving microstructures, such that the light guiding plate 20 is always not scratched by the diffusion unit 50. In other embodiments, if the diffusion dots 51 are disposed on the second top surface 42 (see FIG. 13A), the light guiding plate 20 is always not scratched by the diffusion unit 50, regardless of whether the diffusion dots 51 are outwardly convex microstructures or inwardly concave microstructures.

Similarly, the diffusion film 40 is divided into a plurality of areas according to the area densities of the diffusion unit 50, and the areas of the diffusion film 40 correspond to the areas of the light guiding plate 20, as the four areas separated by three broken lines shown in FIG. 5. FIG. 2 to FIG. 5 illustrate the technical features of this embodiment, two of the areas are taken as an example. For example, the area closest to the light source module 10 is called a third area 43, and the area farthest from the light source module 10 is called a fourth area 44. Specifically, the first area 25 of the light guiding plate 20 is correspondingly projected to the third area 43 of the diffusion film 40, and the second area 26 of the light guiding plate 20 is correspondingly projected to the fourth area 44 of the diffusion film 40.

In the first embodiment, the diffusion dots 51 are distributed on different areas by different densities, and the tendency of the distributed area densities of the diffusion dots 51 is complementary to the tendency of the distributed area densities of the luminous dots 31. In detail, the diffusion dots 51 are distributed on the third area 43 by a third density D3, and the diffusion dots 51 are distributed on the fourth area 44 by a fourth density D4, wherein the fourth density D4 is different from the third density D3. In this exemplification, the third density D3 is the ratio of the total occupied area of the diffusion dots 51 within the third area 43 to the area of the third area 43 (i.e., the number of the diffusion dots 51 within the third area 43×the area of single diffusion dot 51/the area of third area 43×100%), and the fourth density D4 is the ratio of the total occupied area of the diffusion dots 51 within the fourth area 44 to the area of the fourth area 44 (i.e., the number of the diffusion dots 51 within the fourth area 44×the area of single diffusion dot 51/the area of the fourth area 44×100%). Also, the aforementioned so-called "complementary tendencies" means that the sum of the first density D1 and the third density D3 after an approximation (e.g., after being rounded off to unit digit or being rounded off to one decimal place) is equal to a predetermined value, and the sum of the second density D2 and the fourth density D4 after the approximation (e.g., after the same rounding as the sum of the first density D1 and the third density D3) is also equal to the predetermined value, and the rest of the areas on the light guiding plate 20 and the diffusion film 40 are in a similar vein. According to the above-mentioned conditions, it can be concluded that the fourth density D4 is smaller than the third density D3 (because the second density D2 is greater than the first density D1), and the distributed tendency of the diffusion dots 51 on the diffusion film 40 must be contrary to the distributed tendency of the luminous dots 31 from the first area 25 (the first density D1) to the second area 26 (the second density D2).

It should be noted that the selection of the predetermined value can be adjusted based on the product specifications and the market positioning. For convenience of explanation, here the given value of the first density D1 is 10%, and the given value of the second density D2 value is 50%, and the specification of the product which the light emitting device 1 is applied to require higher luminance. In this case, if the selected predetermined value is lower, it is more favorable to achieve the above requirement (due to less number of times of refraction and lower losses of light energy). For example, assuming that a predetermined value A1 is set to 60% (A1=60%), it can be calculated according to the condition of "complementary tendencies": the third density D3 of the diffusion dots 51 on the third area 43 should be determined as follows, the predetermined value A1 minus the first density D1, so the third density D3 will be 50% (A1−D1=50%); the fourth density D4 of the diffusion dots 51 on the fourth area 44 should be determined as follows, the predetermined value A1 minus the second density D2, so the fourth density D4 will be 10% (A1−D2=10%). In another aspect, if the specification of the product which the light emitting device 1 is applied to requires higher quality and higher haze, when the predetermined value is higher, it is more favorable to achieve the above requirements (due to more number of times of refraction, better concealing capabilities, and more uniform distribution of luminance). For example, assuming that a predetermined value A2 is set to 90% (A2=90%), it can also be calculated according to the condition of "complementary tendencies": the third density D3 of the diffusion dots 51 on the third area 43 should be determined as follows, the predetermined value A2 minus the first density D1, so the third density D3 will be 80% (A2−D1=80%), and the fourth density D4 of the diffusion dots 51 on the fourth area 44 should be determined as follows, the predetermined value A2 minus the second density D2, so the fourth density D4 will be 40% (A2−D2=40%).

Figure 6:
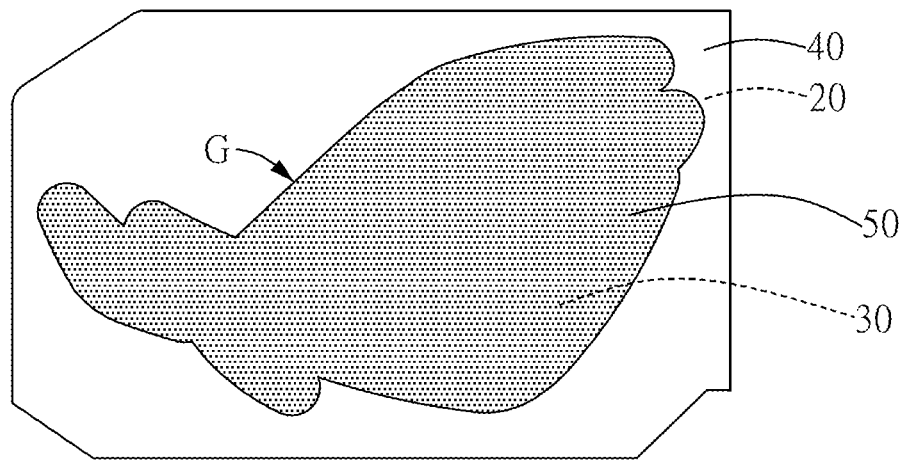
FIG. 6 is a schematic top view of the light guiding plate and the diffusion film of the light emitting device shown in FIG. 2.

The beneficial effects of this embodiment and how it overcomes the conventional disadvantages are specified hereinafter. Comparing FIG. 4 with FIG. 5, the density of the luminous dots 31 (i.e., the first density D1) on the first area 25 is relatively low, and it is prone to have the problem of grainy light spots while the luminous dots 31 are guiding the light. However, in the first embodiment, since the density of the diffusion dots 51 (i.e., the third density D3) on the third area 43 which is correspondingly projected by the first area 25 from the light guiding plate 20 to the diffusion film 40 is complementary to the first density D1, the diffusion dots 51 on the third area 43 has a higher density (i.e., much higher haze capability), such that it can effectively overcome the graininess problem that may formerly occur on the first area 25. For the second area 26, the density of the luminous dots 31 (i.e., the second density D2) is relatively high, and the problem of visually-grainy light spots is insignificant. At this time, since the density of the diffusion dots 51 (i.e., the fourth density D4) on the fourth area 44 which is correspondingly projected by the second area 26 is complementary to the second density D2, the diffusion dots 51 on the fourth area 44 has a lower density (i.e., much lower level of luminance attenuation), such that the problem of significant luminance decrease due to the installation of the conventional diffusion film can be effectively relieved. FIG. 6 is a schematic top view of the light guiding plate 20 and the diffusion film 40 of the light emitting device 1 shown in FIG. 2. As above, when the diffusion film 40 is disposed above the light guiding plate 20, the effect of maintaining the luminance and the uniformity of illumination of the light emitting device 1 can be achieved at the same time.

Figure 7:
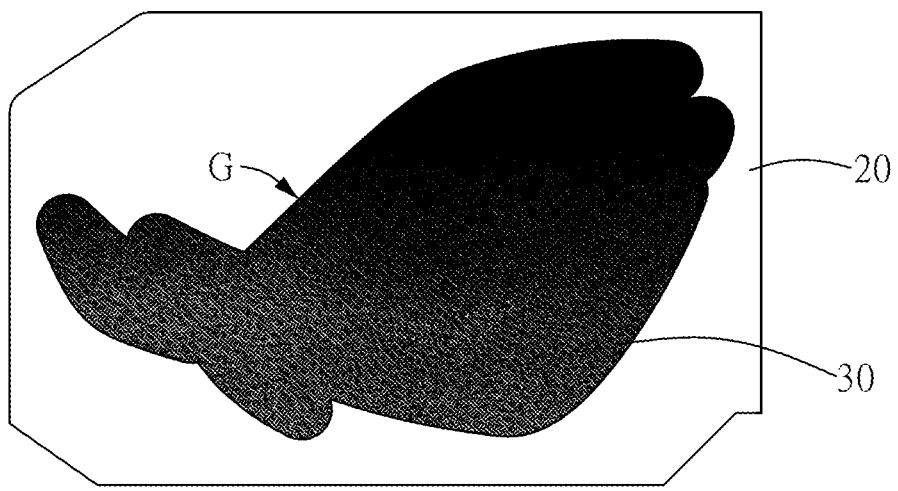
FIG. 7 is a schematic top view of a light guiding plate of a light emitter device in the present disclosure when applied to an actual product.

FIG. 7 is a schematic top view of a light guiding plate of a light emitter device in the present disclosure when applied to an actual product. Please refer to FIG. 7, and compare it with FIG. 4 and FIG. 5. It should be noted that, as shown in FIG. 4 and FIG. 5, in the first embodiment, the light guiding plate 20 (or the diffusion film 40) is distinguished four areas having four different area densities of the luminous dots 31 (or the diffusion dots 51) according to the distances from the light source module 10. The intention of the simplification hereinabove is to clearly explain the key point of the technical features. Actually, as shown in FIG. 7, when the luminous dot unit 30 and the diffusion unit 50 are practically applied to an end product, although the respective areas are distinguished according to the area densities, yet a unit area is relatively tiny and the amount of unit areas is huge. That is, in practical applications, the changes of the area densities of the luminous dots 31 and the diffusion dots 51 from one area to another can be regarded as "continuous changes," instead of "step changes" as shown in FIGS. 4 and 5. In this way, a light emitting device with good visual uniformity can be produced, and the conventional problem of visually-noticeable difference can be overcome. In other words, in other variations of the first embodiment, much more than four areas can be distinguished on the light guiding plate 20 and the diffusion film 40, and the luminous dots 31 and the diffusion dots 51 are distributed in gradually-increased and gradually-decreased area densities, respectively. The above-mentioned variations of the first embodiment are only required to conform to that one of the areas on the light guiding plate 20 (e.g., the first area 25 or the second area 26 in the first embodiment) is corresponding to one of the areas on the diffusion film 40 (e.g., the third area 43 or the fourth area 44 in the first embodiment), and that the sum of the area densities of the above-mentioned two areas (e.g., the sum of the first density D1 and the third density D3 or the sum of the second density D2 and the fourth density D4 in the first embodiment) after an approximation is equal to a predetermined value to achieve uniform illumination and maintained luminance.

In summary, in the first embodiment, through designing the area densities of the luminous dots 31 on the light guiding plate 20 and the diffusion dots 51 on the diffusion film 40 to be complementary (i.e., the two area densities on the two corresponding areas are added, approximated, and then equal to a predetermined value), the following advantages are obtained: (1) there is no visually-grainy light spot near the light entry side 23; (2) there is no decrease in luminance due to excessive haze near the counter light entry side 24; and (3) the overall light emitting device 1 does not appear any visually-noticeable difference. Therefore, the shortcomings in the prior arts can be effectively overcome.

Figure 8:
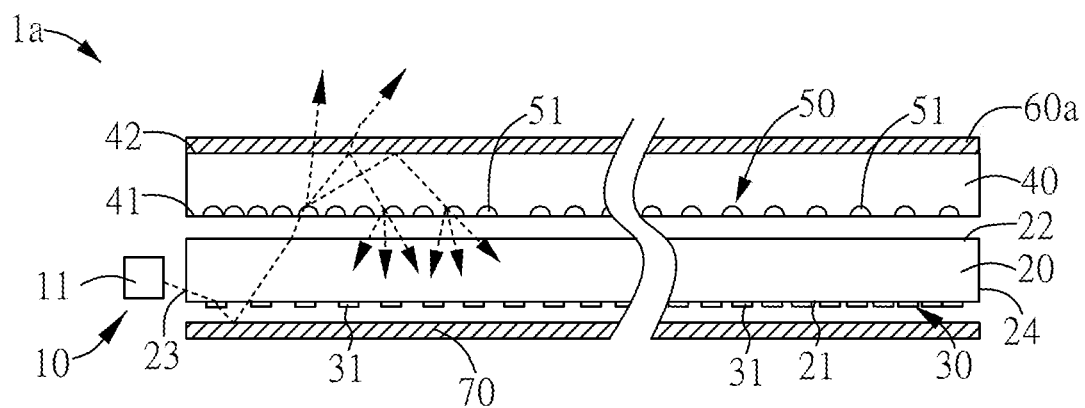
FIG. 8 is a cross-sectional schematic drawing of a light emitting device in a second embodiment of the present disclosure.

FIG. 8 is a cross-sectional schematic drawing of a light emitting device 1a in a second embodiment of the present disclosure. Referring to FIG. 8, it should be noted that the light emitting device 1a of the second embodiment differs from the light emitting device 1 of the first embodiment (see FIG. 3) in that the light emitting device 1a further includes a transmissive and reflective layer 60a. Therefore, the remaining components follow the above reference numerals, and can directly refer to the description of the first embodiment. In the second embodiment, the luminous dot unit 30 is disposed on the first bottom surface 21 of the light guiding plate 20, and the diffusion unit 50 is disposed on the second bottom surface 41 of the diffusion film 40. The transmissive and reflective layer 60a is disposed above the light guiding plate 20. The transmissive and reflective layer 60a of the second embodiment is disposed on the second top surface 42 of the diffusion film 40 as an example for demonstration. In other embodiments (e.g., the third or the fourth embodiment), the transmissive and reflective layer can also be disposed on the second bottom surface 41 of the diffusion film 40 (see FIG. 10) or the first top surface 22 of the light guiding plate 20 (see FIG. 11), as detailed hereinafter.

Figure 9:
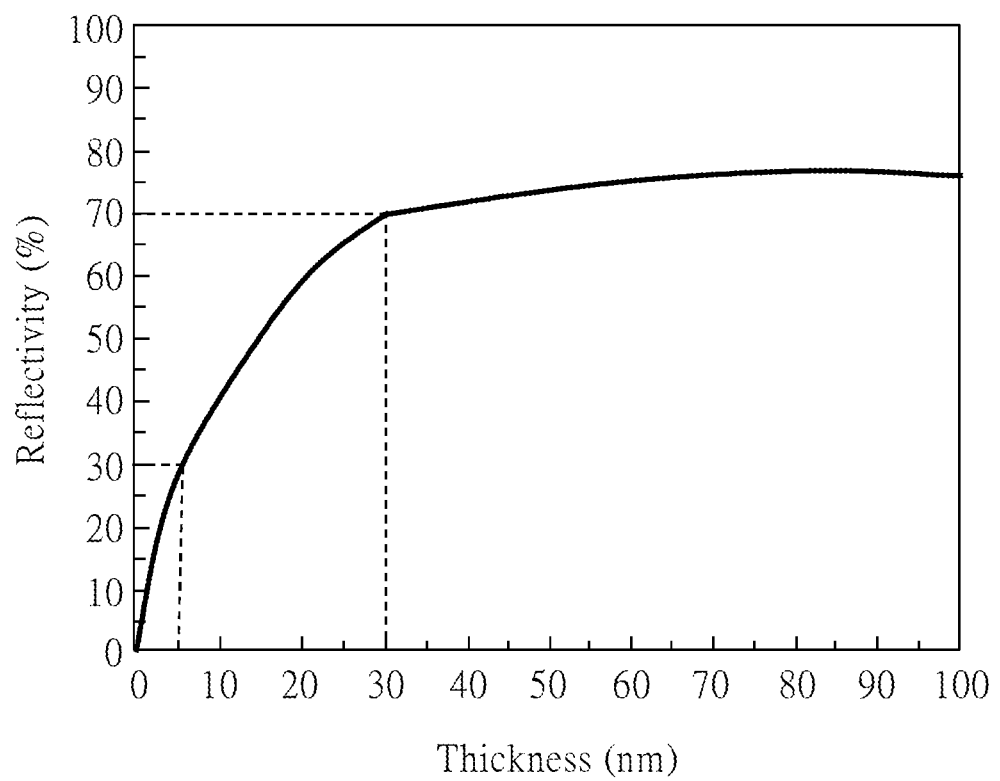
FIG. 9 is a schematic diagram showing relationship between reflectivity and thickness of an aluminum film.

An exemplification of the transmissive and reflective layer 60a can be achieved by printing translucent ink, printing white ink, printing a metal coating (e.g., silver paint), or evaporating a metal film (e.g., a silver film or an aluminum film). The reflectivity of the transmissive and reflective layer 60a is controlled by choosing the material and the thickness of the material. In general, the use of the printed ink may have the problem of chromatic aberration, and the thickness of the coated metal is not easy to uniform, so a better solution is to use a metal film. FIG. 9 is a schematic diagram showing relationship between reflectivity and thickness of an aluminum film, wherein the operable range of reflectivity is from 0% to about 70%, and within the range it roughly presents an upward trend in natural logarithm. Considering this upward trend of natural logarithm, if the chosen value of the reflectivity or the chosen thickness of the aluminum film is too low, the manufacturing variation during production will be significant, resulting in poor reliability while mass production. Therefore, considering the thickness tolerance of the evaporation process (which is about ±1 nm), the minimum chosen value of the reflectivity is 30% (corresponding to the thickness of 5 nm for the aluminum film, as shown in FIG. 9), which is a better solution for mass production, and the maximum chosen value of the reflectivity is 70%. In practice, if the aluminum film is used as the transmissive and reflective layer 60a, its reflectivity of light is between 30% and 70%, but the present disclosure is not limited thereto. That is, by selecting different materials, different processes and different thicknesses, the transmissive and reflective layer 60a could be implemented within a range of reflectivity from 5% to 95%. For example, when the reflectivity of the transmissive and reflective layer 60a is 40%, as shown in FIG. 8, the light emitted by the light source module 10 enters the light guiding plate 20 via the light entry side 23, reaches the luminous dots 31, and is reflected by the luminous dots 31 and reflected by the reflection plate 70, then directed to the diffusion film 40. When the light reaches the diffusion dots 51 and is refracted by one of them, its propagating direction is changed. Then, the light reaches the boundary between the diffusion film 40 and the transmissive and reflective layer 60a (e.g., the second top surface 42 of the diffusion film 40). However, only 60% of the light can pass through the transmissive and reflective layer 60a, and the remaining 40% of the light is reflected by the transmissive and reflective layer 60a back to the diffusion film 40 and reenters the light guiding plate 20 being reused. The installation of the transmissive and reflective layer 60a allows the light to be retarded in a manner of segmented and stepwise emergences, thereby the effect of haze can be further enhanced due to the foregoing scheme.

For example, Table I shows the area densities of the luminous dots 31 of the luminous dot unit 30 at several notionally-segmentalized positions on the light guiding plate 20 and the luminance of transmitted light (i.e., emergent light intensity) of the light emitting device 1a right above each position (in which the light entry side 23 is at 0 mm), while the light emitting device 1a does not utilize the transmissive and reflective layer 60a, the diffusion film 40 and the diffusion unit 50. That is, in the case of Table I, the light emitting device 1a includes only the light source module 10, the light guiding plate 20, the luminous dot unit 30, and the reflection plate 70. Specifically, the minimum area density of the luminous dot unit 30 is limited to 10%. As shown in Table I, when the light emitting device 1a does not utilize the transmissive and reflective layer 60a, the diffusion film 40 and the diffusion unit 50, the uniformity of emergent light intensity of the light emitting device 1a is only 60% (i.e., 150 nits/90 nits=60%).

TABLE I

| Position (mm) | 10 | 20 | 30 | 40 | 50 | 60 |
|---|---|---|---|---|---|---|
| Area density of luminous dots (%) | 10 | 10 | 15 | 20 | 25 | 30 |
| Luminance of transmitted light (nits) | 150 | 90 | 90 | 90 | 90 | 90 |

However, after utilizing the transmissive and reflective layer 60a (but still no diffusion film 40 and no diffusion unit 50), the uniformity of emergent light intensity of the light emitting device 1a will return to 100%. Specifically, the transmissive and reflective layer 60a having the reflectivity of 40% (that is, 60% of the light is transmitted) is used as an example, and the optical change of each position is discussed hereinafter. Of course, the transmissive and reflective layer 60a having the reflectivity of 40% is only presented as an embodiment. In practice, the required reflectivity can be chosen according to the overall size of different products or the thickness of different light guiding plates. Table II shows that the light emitting device 1a utilizes the transmissive and reflective layer 60a (but does not utilize the diffusion film 40 and the diffusion unit 50), the area density of the luminous dots 31 of the luminous dot unit 30 at each notionally-segmentalized position on the light guiding plate 20 (in which the light entry side 23 is at 0 mm), the luminance of reflected light of the transmissive and reflective layer 60a, and the luminance of transmitted light of the light emitting device 1a right above each position. Comparing the optical changes at 10 mm in Table I and Table II: when the transmissive and reflective layer 60a is not utilized, the light energy of 150 nits emitted therefrom will be transmitted out completely, but when the transmissive and reflective layer 60a is utilized, the light energy of 150 nits will be emitted in segments; the light of 150 nits that originally would have been emitted at 10 mm in Table I will be emitted out in segments at the positions of 10 mm, 20 mm, and 30 mm, and so on. Also, the luminances of transmitted light at the positions are 90 nits, 36 nits, 14.4 nits, and so on, as listed in Table II.

TABLE II

| Position (mm) | 10 | 20 | 30 | 40 | 50 | 60 |
|---|---|---|---|---|---|---|
| Area density of luminous dots (%) | 10 | 10 | 15 | 20 | 25 | 30 |
| Luminance of transmitted light (nits) | 150 * 0.6 = 90 | 60 * 0.6 = 36 | 24 * 0.6 = 14.4 | 9.6 * 0.6 = 5.76 | 3.84 * 0.6 = 2.304 | 1.536 * 0.6 = 0.9216 |
| Luminance of reflected light (nits) | 150 − 90 = 60 | 60 − 36 = 24 | 24 − 14.4 = 9.6 | 9.6 − 5.76 = 3.84 | 3.84 − 2.304 = 1.536 | 1.536 − 0.9216 = 0.6144 |

Similarly, the light of 90 nits originally emitted at the position of 20 mm will also be emitted in segments; the light of 90 nits that originally would have been transmitted at 20 mm in Table I will be emitted out in segments at the positions of 20 mm, 30 mm, 40 mm, and so on. Also, the luminances of transmitted light at the positions are 54 nits, 21.6 nits, 8.64 nits, and so on, as listed in Table III.

TABLE III

| Position (mm) | 10 | 20 | 30 | 40 | 50 | 60 |
|---|---|---|---|---|---|---|
| Area density of luminous dots (%) | 10 | 10 | 15 | 20 | 25 | 30 |
| Luminance of transmitted light (nits) | — | 90 * 0.6 = 54 | 36 * 0.6 = 21.6 | 14.4 * 0.6 = 8.64 | 5.76 * 0.6 = 3.456 | 2.304 * 0.6 = 1.3824 |
| Luminance of reflected light (nits) | — | 90 − 54 = 36 | 36 − 21.6 = 14.4 | 14.4 − 8.64 = 5.76 | 5.76 − 3.456 = 2.304 | 2.304 − 1.3824 = 0.9216 |

Hereinafter, the fully segmental variations of the luminances of transmitted and reflected light at the positions 30 mm to 60 mm will not be listed, yet the optical quantities of final emergence at each position will be directly integrated in Table IV. As can be seen from Table IV, the light emitting device 1a utilizing the transmissive and reflective layer 60a (but no the diffusion film 40 and no the diffusion unit 50) achieves the uniformity of emergent light intensity of 100% (i.e., 90 nits % nits=100%). Therefore, the transmissive and reflective layer 60a can adjust the uniformity of emergent light intensity from a worse case of 60% to the best case of 100%. It should be noted that, in the above-mentioned examples, since the light emitting device 1a utilizes only the transmissive and reflective layer 60a and does not utilize the diffusion film 40 and the diffusion unit 50, hence the capability of haze (or concealing) would be worse than that of the light emitting device 1a shown in FIG. 8 (which utilizes all of the transmissive and reflective layer 60a, the diffusion film 40, and the diffusion unit 50).

TABLE IV

| Position (mm) | 10 | 20 | 30 | 40 | 50 | 60 |
|---|---|---|---|---|---|---|
| Contribution of segmented emergence of light from 10 mm (nits) | 90 | 36 | 14.4 | 5.76 | 2.304 | 0.9216 |
| Contribution of segmented emergence of light from 20 mm (nits) | — | 54 | 21.6 | 8.64 | 3.456 | 1.3824 |
| Contribution of segmented emergence of light from 30 mm (nits) | — | — | 54 | 21.6 | 8.64 | 3.456 |
| Contribution of segmented emergence of light from 40 mm (nits) | — | — | — | 54 | 21.6 | 8.64 |
| Contribution of segmented emergence of light from 50 mm (nits) | — | — | — | — | 54 | 21.6 |
| Contribution of segmented emergence of light from 60 mm (nits) | — | — | — | — | — | 54 |
| Total contribution of each position (nits) | 90 | 90 | 90 | 90 | 90 | 90 |

As mentioned above, in practice, the microstructures of the conventional light guiding plate has a limit of minimum area density. Corresponding to the features of the second embodiment, the first density D1 of the luminous dots 31 on the first area 25 of the light guiding plate 20 also may have a lower limit (e.g., 10%). That is, when the first density D1 is less than 10%, the first area 25 (or the third area 43 projected from the first area 25) may appear visually-grainy light spots. At this time, even if the third area 43 has been configured with much denser diffusion dots 51, the problem of visual graininess may not be perfectly solved. Therefore, in the second embodiment, by providing the transmissive and reflective layer 60a disposed above the light guiding plate 20, the effect of haze can be further enhanced and the problem of visual graininess can be finally solved. In other words, by providing the transmissive and reflective layer 60a, the first density D1 of the luminous dots 31 on the light guiding plate 20 can no longer be restricted by the minimum area density (which means that, for example, the first density D1 can be much less than 10%, without the consequence of visually-grainy light spots, because of the remedy from the transmissive and reflective layer 60a).

Moreover, the reflectivity of light of the transmissive and reflective layer 60a decreases as a thickness (d) of the light guiding plate 20 increases. For example, a minimum reflectivity ($R_{min}$) and a maximum reflectivity ($R_{max}$) of the transmissive and reflective layer 60a can be obtained by the following equations, where "a" is a main amplitude-modulation coefficient, "b" is a secondary amplitude-modulation coefficient, "c1" is a minimum control coefficient, and "c2" is a maximum control coefficient. In the second embodiment, "a" is 77.48564, "b" is 0.17023, "c1" is 6.9378, and "c2" is 24.5412.

$$R_{min}(d) = a * e^{(-d/b)} + c1$$

$$R_{max}(d) = a * e^{(-d/b)} + c2$$

Figure 10:
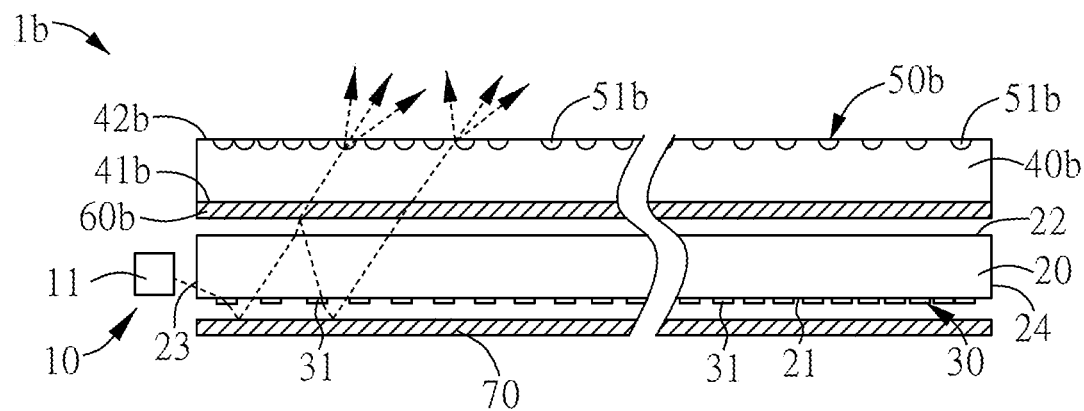
FIG. 10 is a cross-sectional schematic drawing of a light emitting device in a third embodiment of the present disclosure.

FIG. 10 is a cross-sectional schematic drawing of a light emitting device 1b in a third embodiment of the present disclosure. Referring to FIG. 10, in the third embodiment, the light emitting device 1b includes a light source module 10, a light guiding plate 20, a luminous dot unit 30, a diffusion film 40b, a diffusion unit 50b, a transmissive and reflective layer 60b and a reflection plate 70. Specifically, the configuration of the light source module 10, the light guiding plate 20 and the luminous dot unit 30 is the same as that of the first embodiment. For example, the luminous dot unit 30 is disposed on the first bottom surface 21, so the reference numerals are used. However, in the third embodiment, the configuration of the diffusion film 40b, the diffusion unit 50b and the transmissive and reflective layer 60b is different from the first and the second embodiments. In this embodiment, the diffusion unit 50b is disposed on the second top surface 42b of the diffusion film 40b, and the transmissive and reflective layer 60b is disposed between the first top surface 22 and the second bottom surface 41b. The transmissive and reflective layer 60b in the third embodiment is disposed on the second bottom surface 41b of the diffusion film 40b. In other embodiments (e.g., the fourth embodiment), the transmissive and reflective layer 60b may also be disposed on the first top surface 22 of the light guiding plate 20, but the present disclosure is not limited thereto.

Similarly, the transmissive and reflective layer 60b having a reflectivity of 60% is utilized as an example. The light emitted by the light source module 10 enters the light guiding plate 20 via the light entry side 23, reaches the luminous dots 31, and is guided toward the first top surface 22 after being refracted by the luminous dots 31 and reflected by the reflection plate 70. Then, due to the disposal of the transmissive and reflective layer 60b, only 40% of the light can enter the diffusion film 40b and the diffusion dots 51b can change the propagating direction of the light, allowing the light to leave the diffusion film 40b at a larger angle of emergence to achieve the overall effect of haze. The remaining 60% of the light is reflected by the transmissive and reflective layer 60b back to the light guiding plate 20 for reuse, and the light is also retarded in the manner of segmented and stepwise emergences thus the effect of haze is further enhanced.

Figure 11:
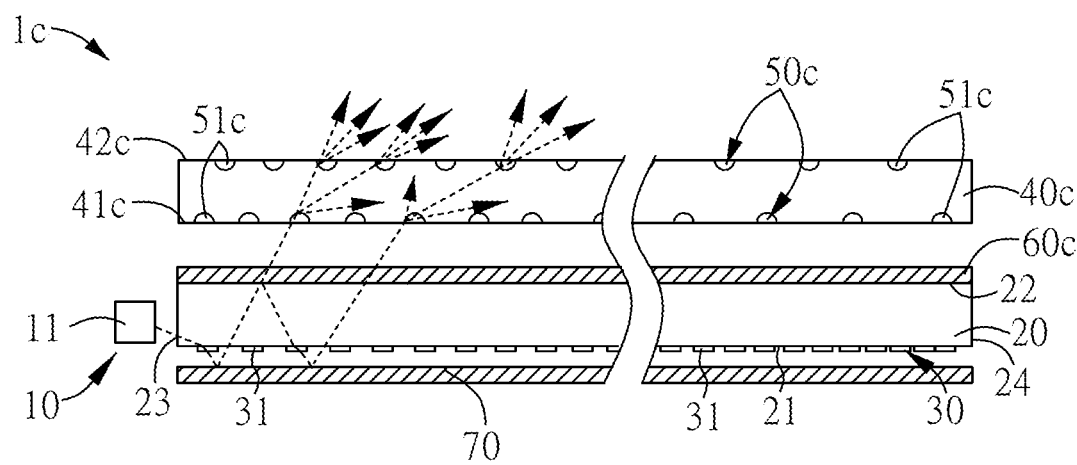
FIG. 11 is a cross-sectional schematic drawing of a light emitting device in a fourth embodiment of the present disclosure.

FIG. 11 is a cross-sectional schematic drawing of a light emitting device 1c in a fourth embodiment of the present disclosure. Referring to FIG. 11, in the fourth embodiment, the light emitting device 1c includes a light source module 10, a light guiding plate 20, a luminous dot unit 30, a diffusion film 40c, a diffusion unit 50c, a transmissive and reflective layer 60c and a reflection plate 70. Similarly, the light source module 10, the light guiding plate 20 and the luminous dot unit 30 are configured in the same manner as the first embodiment. For example, the luminous dot unit 30 is disposed on the first bottom surface 21, so the reference numerals are used. In the fourth embodiment, the configuration of the diffusion film 40c, the diffusion unit 50c, and the transmissive and reflective layer 60c is different from the first, the second, and the third embodiments. In this embodiment, the diffusion unit 50c is disposed on the second bottom surface 41c and the second top surface 42c of the diffusion film 40c. The transmissive and reflective layer 60c is disposed on the first top surface of the light guiding plate 20.

Similarly, the transmissive and reflective layer 60c with the reflectivity of 60% is utilized as an example for demonstration. Therefore, only 40% of the light can enter the diffusion film 40c from the light guiding plate 20. Then, the diffusion dots 51c disposed at the second bottom surface 41c and/or the second top surface 42c change the propagating direction of light, such that the light can be emergent from the diffusion film 40c at a larger angle of emergence to achieve the overall effect of haze. The remaining 60% of the light reflected by the transmissive and reflective layer 60c is still utilized inside the light guiding plate 20, which also allows the light within the light guiding plate 20 to be retarded in the manner of segmented and stepwise emergences to further enhance the effect of haze.

Figure 12:
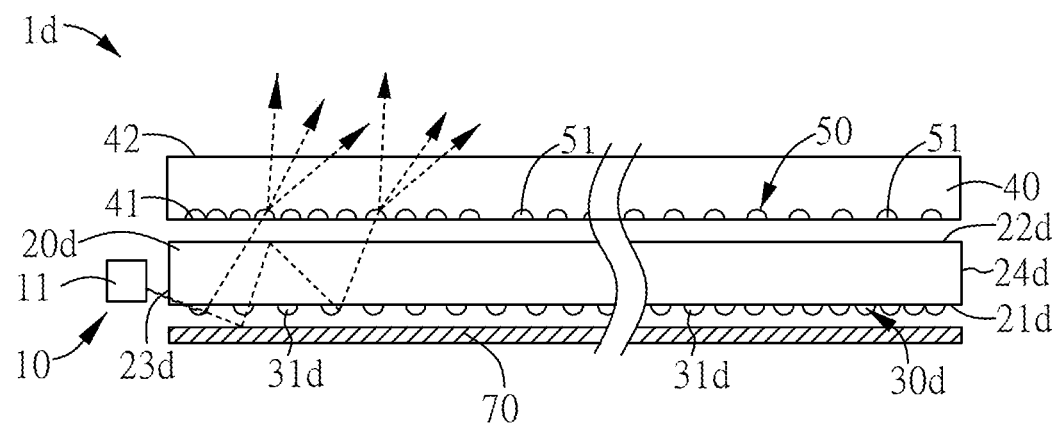
FIG. 12 is a cross-sectional schematic drawing of a light emitting device in a fifth embodiment of the present disclosure.

FIG. 12 is a cross-sectional schematic drawing of a light emitting device 1d in a fifth embodiment of the present disclosure. Referring to FIG. 12, the light emitting device 1d of the fifth embodiment differs from the light emitting device 1 of the first embodiment in that the luminous dots 31d is numerous rugged microstructures, for example, an outwardly protruding microstructures (which differ from the printed ink dots of the luminous dots 31 shown in FIG. 3) to cancel the total internal reflection of light at some places inside the light guiding plate 20d, by causing the light to refract when it hits one of the luminous dots 31d. Then, the light is directed toward the first top surface 22d by the reflection plate 70. In other variations of the fifth embodiment, the luminous dots 31d can also be numerous inwardly concaving microstructures, and the present disclosure is not limited thereto.

Figure 13A:
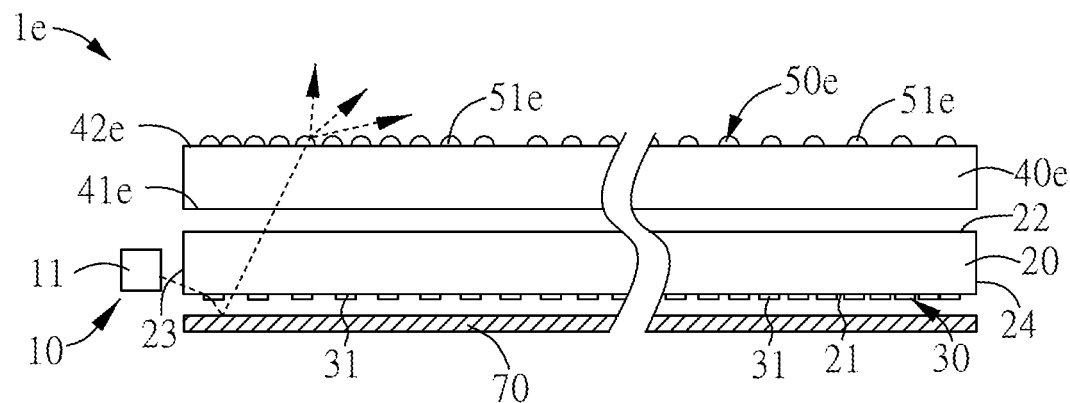
FIG. 13A is a cross-sectional schematic drawing of a light emitting device in a sixth embodiment of the present disclosure.
Figure 13B:
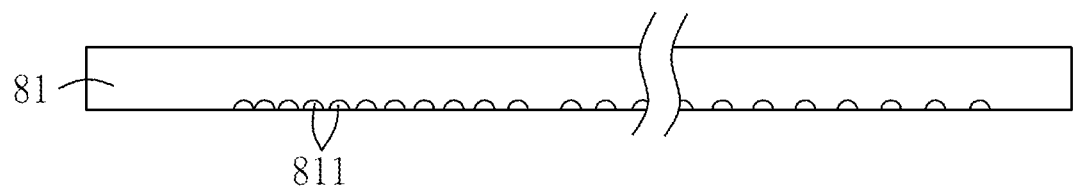
FIG. 13B is a cross-sectional schematic drawing of a first template for forming a diffusion film and a diffusion unit shown in FIG. 13A.

FIG. 13A is a cross-sectional schematic drawing of a light emitting device 1e in a sixth embodiment of the present disclosure. FIG. 13B is a cross-sectional schematic drawing of a first template 81 for forming a diffusion film 40e and a diffusion unit 50e shown in FIG. 13A. Referring to FIGS. 13A and 13B, in the sixth embodiment, the light emitting device 1e includes a light source module 10, a light guiding plate 20, a luminous dot unit 30, a diffusion film 40e, a diffusion unit 50e and a reflection plate 70. Specifically, the configuration and the structure of the light source module 10, the light guiding plate 20 and the luminous dot unit 30 are the same as those of the first embodiment, so the reference numerals are used. The diffusion unit 50e in the sixth embodiment may be disposed on the second top surface 42e of the diffusion film 40e, that is, the diffusion dots 51e is distributed on the upper surface of the diffusion film 40e. In the sixth embodiment, the diffusion dots 51e are numerous outwardly protruding microstructures, also for changing the propagating direction of light to produce the overall visual effect of haze.

To form the diffusion film 40e and the diffusion unit 50e, a first template 81 can be used. The first template 81 may be a steel master mold and has a plurality of concaving dots 811, as shown in FIG. 13B. Specifically, for example, the set of all concaving dots 811 can also exhibit the specific pattern G as shown in FIG. 5, and the distribution tendency of the area density of the concaving dots 811 can also be similar to the diffusion unit 50 as shown in FIG. 5. Then, the diffusion film 40e and the diffusion unit 50e of the sixth embodiment can be produced by a process of injection molding or a process of hot rolling utilizing the first template 81. Therefore, for the diffusion film 40e and the diffusion unit 50e manufactured by the first template 81, each diffusion dot 51e is an outwardly protruding microstructure, as shown in FIG. 13A.

Figure 14:
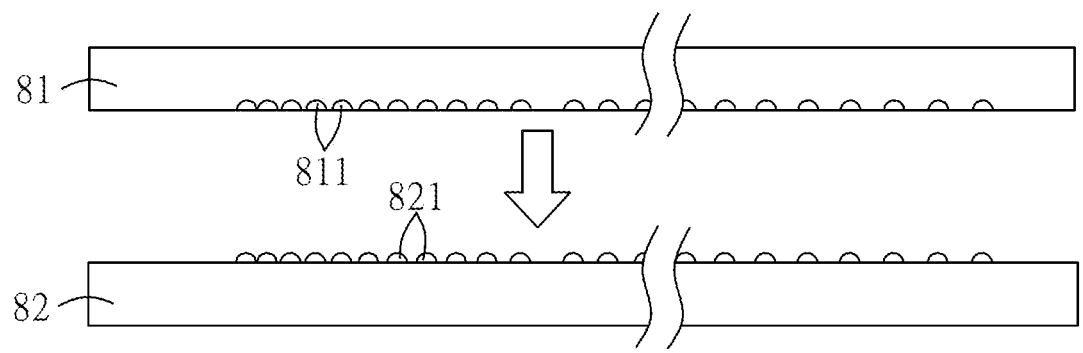
FIG. 14 is a cross-sectional schematic drawing of the first template shown in FIG. 13B and a second template for forming the diffusion film and the diffusion unit shown in FIG. 3.

FIG. 14 is a cross-sectional schematic drawing of the first template 81 shown in FIG. 13B and a second template 82 used for forming the diffusion film 40 and the diffusion unit 50 shown in FIG. 3. Referring to FIG. 3 and FIG. 14, to form the diffusion film 40 and the diffusion unit 50 as shown in FIG. 3, that is, to form a diffusion unit 50 with numerous inwardly-concaving diffusion dots 51, firstly, use the first template 81 (a steel master mold) to cast a second template 82 (a nickel-plate male mold), both of which have the microstructures opposite to each other. In other words, the second template 82 has a plurality of protruding dots 821 whose distribution tendency of the area density is identical to the diffusion unit 50 as shown in FIG. 5. Then, the diffusion film 40 and the diffusion unit 50 are manufactured by a process of injection molding or a process of hot rolling using the second template 82. Finally, each of the diffusion dots 51 is an inwardly concaving microstructure that is opposite to each of the diffusion dot 51e of the diffusion unit 50e (i.e., an outwardly protruding microstructure). In short, the diffusion film 40 and the diffusion unit 50 (each of the diffusion dots 51 is an inwardly concave microstructure) is formed by the second template 82 which is cast from the first template 81, and the diffusion film 40e and the diffusion unit 50e (each of the diffusion dots 51e is an outwardly protruding microstructure) is formed by the first template 81.

The diffusion dots 51, 51b, 51c is numerous inwardly concaving microstructures, and the diffusion dots 51e is numerous outwardly protruding microstructures. That is, all of the above-mentioned embodiments achieve the overall visual effect of haze through the outwardly protruding or the inwardly concaving microstructures, thus the conventional diffusion particles are not required, such that there is no diffusion particle falling down to the light guiding plate 20 and scratching it. Also, to increase the effect of haze (or concealing capability), the user can simply increase the area densities of the diffusion dots 51, 51b, 51c, 51e, which are respectively distributed on the diffusion films 40, 40b, 40c, 40e, without increasing the thickness of the diffusion films 40, 40b, 40c, 40e. Accordingly, the thinization of the light emitting device 1, 1a, 1b, 1c, 1 d, 1e can be accomplished.

As described above, according to the light emitting device of the present disclosure, the light guiding plate has the first area and the second area, correspondingly projected to the third area and the fourth area of the diffusion film, respectively. Also, the luminous dots are distributed on the first area and the second area of the light guiding plate by the first density and the second density, respectively. The diffusion dots are distributed on the third area and the fourth area by the third density and the fourth density, respectively. The third density is different from the fourth density to form the diffusion film with different hazes in different areas. Further, by the sum of the first density and the third density after the approximation and the sum of the second density and the fourth density after the approximation being both equal to the predetermined value, the uniform illumination and the maintained luminance of the light emitting device can be achieved at the same time.

It should be noted that the embodiments of the present disclosure described above are only illustrative. All without departing from the scope of the disclosure are defined solely by the appended claims.

What is claimed is:

1. A light emitting device, comprising:
   a light source module;
   a light guiding plate, which is disposed adjacent to the light source module;
   a luminous dot unit, disposed on the light guiding plate, the luminous dot unit including a plurality of luminous dots distributed on a surface of the light guiding plate, wherein the luminous dots distributed on a first area of the light guiding plate by a first density, the luminous dots distributed on a second area of the light guiding plate by a second density, and the second density is different from the first density;
   a diffusion film, which is disposed above the light guiding plate;
   a diffusion unit, which is disposed on the diffusion film, the diffusion unit comprising a plurality of diffusion dots distributed on a surface of the diffusion film, the diffusion dots distributed on a third area of the diffusion film by a third density, the diffusion dots distributed on a fourth area of the diffusion film by a fourth density, the first area of the light guiding plate is correspondingly projected to the third area of the diffusion film, the second area of the light guiding plate is correspondingly projected to the fourth area of the diffusion film, wherein the fourth density is different from the third density, a sum of the first density and the third density after an approximation is equal to a predetermined value, and a sum of the second density and the fourth density after the approximation is equal to the predetermined value; and
   a transmissive and reflective layer, which is disposed above the light guiding plate, the transmissive and reflective layer has a reflectivity which is more than 5% and less than 95%, and the reflectivity of the transmissive and reflective layer decreases as a thickness of the light guiding plate increases.

2. The light emitting device as claimed in claim 1, wherein the shortest distance from the first area to the light source module is less than the shortest distance from the second area to the light source module, and the first density is less than the second density.

3. The light emitting device as claimed in claim 1, wherein the light guiding plate includes a first bottom surface, a first top surface on the opposite side of the first bottom surface, and a side connecting the first bottom surface and the first top surface, the diffusion film includes a second bottom surface facing the first top surface and a second top surface on the opposite side of the second bottom surface, the luminous dot unit is disposed on the first bottom surface, the diffusion unit is disposed on the second bottom surface, the transmissive and reflective layer is disposed on the second top surface, and the light source module emits light toward the side.

4. The light emitting device as claimed in claim 1, wherein the light guiding plate includes a first bottom surface, a first top surface on the opposite side of the first bottom surface, and a side connecting the first bottom surface and the first top surface, the diffusion film includes a second bottom surface facing the first top surface and a second top surface on the opposite side of the second bottom surface, the luminous dot unit is disposed on the first bottom surface, the diffusion unit is disposed on the second top surface, the transmissive and reflective layer is disposed between the first top surface and the second bottom surface, and the light source module emits light toward the side.

5. The light emitting device as claimed in claim 1, wherein the light guiding plate includes a first bottom surface, a first top surface on the opposite side of the first bottom surface, and a side connecting the first bottom surface and the first top surface, the diffusion film includes a second bottom surface facing the first top surface and a second top surface on the opposite side of the second bottom surface, the luminous dot unit is disposed on the first bottom surface, the diffusion unit is disposed on the second bottom surface and the second top surface, the transmissive and reflective layer is disposed on the first top surface, and the light source module emits light toward the side.

6. The light emitting device as claimed in claim 1, further comprising:
   a reflection plate, which is disposed below the light guiding plate.

7. The light emitting device as claimed in claim 1, wherein when the diffusion film and the diffusion unit is formed by a first template, each of the diffusion dots is an outwardly protruding microstructure; when the diffusion film and the diffusion unit is formed by a second template which is cast from the first template, each of the diffusion dots is an inwardly concaving microstructure.

* * * * *